United States Patent [19]

Tokuno

[11] E Re. 31,521

[45] Reissued Feb. 14, 1984

[54] SLITTER-SCORER APPARATUS

[75] Inventor: Masateru Tokuno, Nishinomiya, Japan

[73] Assignee: Rengo Co., Ltd., Osaka, Japan

[21] Appl. No.: 403,291

[22] Filed: Jul. 30, 1982

Related U.S. Patent Documents

Reissue of:

[64] Patent No.: 4,328,727
Issued: May 11, 1982
Appl. No.: 144,309
Filed: Apr. 28, 1980

[30] Foreign Application Priority Data

May 9, 1979 [JP] Japan ..... 54-57378
Mar. 19, 1980 [JP] Japan ..... 55-34954

[51] Int. Cl.[3] ..... B26D 3/08; B26D 11/00

[52] U.S. Cl. ..... 83/106; 83/479; 493/361; 493/370

[58] Field of Search ..... 83/106, 479, 480; 493/361, 370

[56] References Cited

U.S. PATENT DOCUMENTS

| | | | |
|---|---|---|---|
| 3,831,502 | 8/1974 | Tokuno | 83/479 X |
| 3,831,929 | 8/1974 | Hellmer | 83/479 X |
| 3,882,765 | 5/1975 | Tokuno | 83/106 X |
| 4,214,495 | 7/1980 | Coburn | 493/342 X |

*Primary Examiner*—James M. Meister
*Attorney, Agent, or Firm*—LeBlanc, Nolan, Shur & Nies

[57] ABSTRACT

A slitter-scorer apparatus comprises upper and lower slitter-scorer units which are disposed in one above the other relationship and are vertically movable respectively. The apparatus can immediately change slitting and scoring operations along the flowing direction of long and flat materials, which are fed continuously, without any reduction of the flowing speed of the materials, and the operations can be performed on the materials which flow along an approximately straight line, while the total length of the slitter-scorer apparatus is shortened to the upmost.

14 Claims, 17 Drawing Figures

SLITTER-SCORER APPARATUS

Matter enclosed in heavy brackets [ ] appears in the original patent but forms no part of this reissue specification; matter printed in italics indicates the additions made by reissue.

The present invention relates to a slitter-scorer apparatus which is adapted to slit and score long and flat materials, which are continuously fed, along the longitudinal direction or flowing direction.

As slitter-scorer apparatuses of this kind, there were apparatuses of the U.S. Pat. Nos. 3,831,502 and 3,882,765 invented by the present inventor. According to these apparatuses, an order-change for slitting or scoring operation on a material, that is, an operation for changing positions of longitudinal slitting and scoring lines on the material transversely, was instantly performed without any decrease of the delivering speed of the material.

In the apparatuses, two slitter-scorer units are disposed in one above the outer relationship. When the order-change starts, the material is instantly cut off transversely by a rotary shear. The downstream portion of the material is guided to one unit currently used and passes through the unit. The upstream portion is guided to the other unit, that is, the stand-by unit provided with slitting and scoring tools, positions of which have been changed on mounting shafts in accordance with instructions of the order-change, and passes through the unit. If the material is a corrugated board sheet, the material is damaged when it is bent at an angle of approximately 7° or more. Accordingly, the material must be guided at a gentle angle from the exit of the rotary shear to the entrance of the unit and from the exit of the unit to the entrance of a following process. Thus, the total length of the slitter-scorer apparatus, that is, the distance from the exit of the rotary shear to the entrance of the following process through either the upper unit or the lower unit had to be made considerably long.

An object of the present invention is to provide a slitter-scorer apparatus of a type wherein the order-change can be performed immediately, and the long and flat materials continuously fed can be delivered to the following process, without any reduction of the running speed of the materials. The slitter-scorer apparatus is shortened in the total length as much as possible. And the materials are slitted and scored while they run along an approximately straight line from the exit of the rotary shear to the entrance of the following process through the upper or lower slitter-scorer unit.

Another object of the present invention will become apparent from the accompanying drawings and the following detailed description.

According to the objects of the present invention, the upper and lower slitter-scorer units effect an ascending or descending movement during the order-change, and guide plates which are located in face of the entrance and exit of each unit are adapted to be ascended or descended, accompanied by the units.

Figure 1:
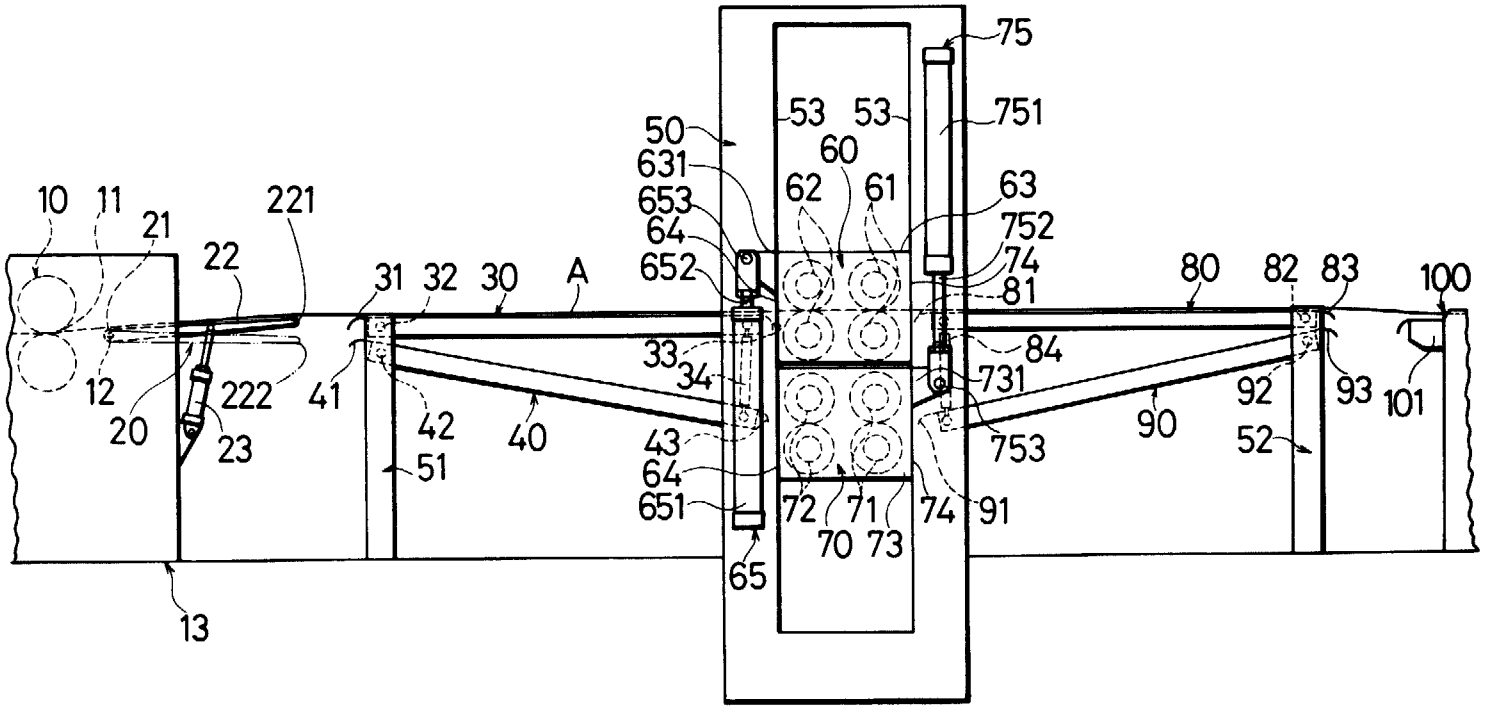
FIG. 1 is a side view showing an embodiment of the present invention.
Figure 3:
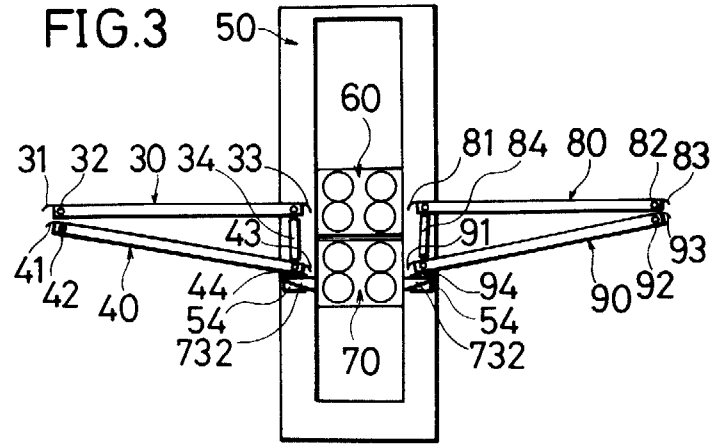
FIG. 2, FIG. 3 and FIG. 4 are diagrams each showing mechanisms for moving upwardly or downwardly upper and lower front guide plates and upper and lower rear guide plates.

A slitter-scorer apparatus which is disposed between a double facer of a corrugating machine for manufacturing corrugated boards and a cut-off machine will be described hereinafter as an embodiment of the present invention.

As shown in FIG. 1 to FIG. 5, the apparatus of the present invention comprises a cutting machine or rotary shear 10, a deflector 20, an upper front guide-plate 30, a lower front guide-plate 40, a machine frame 50, an upper slitter-scorer unit 60 and a lower slitter-scorer unit 70 which are disposed in one above the other relationship on the machine frame 50 and vertically movable, an upper rear guide-plate 80 and a lower rear guide-plate 90.

The rotary shear 10 is a known apparatus, which can instantly cut off transversely long and flat materials, such as a corrugated board web A fed continuously from a double facer (not shown). The rotary shear is mounted on a frame 13.

The deflector 20 is a known apparatus, which can divert the leading edge of the corrugated board A, which is delivered from the rotary shear 10, from an upward position 221 to a downward position 222, or vice versa. The front end 21 of the deflector 20 is rotatably supported on the frame 13 through a support shaft 12, and aligned with the exit 11 of the rotary shear 10. The rear end 22 of the deflector is adapted to vertically moved through a hydraulic piston cylinder apparatus 23 mounted on the frame 13.

The front end 31 of upper front guide-plate 30 is rotatably supported on a frame 51 through a support shaft 32 so that the front end 31 may be aligned with the upward position 221 of the rear end 22 of the deflector 20, while the rear end 33 of the upper front guide-plate 30 is supported on the top ends of a pair of coupling rods 34, which are connected with the rear end 43 of the lower front guide-plate 40, so that the rear end 33 may be aligned with the entrance of the upper slitter-scorer unit 60.

The front end 41 of the lower front guide-plate 40 is rotatably supported on the frame 51 through a support shaft 42 so that the front end 41 may be aligned with the downward position 222 of the rear end 22 of the deflector 20, while the rear end 43 of the lower front guide-plate 40 is supported on a pair of projections 732 of the lower slitter-scorer unit 70 through a support rod 44 secured on the under side of the rear end 43 so that the rear end 43 may be aligned with the entrance of the lower slitter-scorer unit 70.

The upper slitter-scorer unit 60 and the lower slitter-scorer unit 70 are known apparatuses each being adapted to slit and score the corrugated board, which is continuously fed, along the longitudinal direction. The upper slitter-scorer unit 60, as shown, is provided with slitting tool shafts 61 and scoring tool shafts 62, while the lower slitter-scorer unit 70, as shown, is provided with slitting tool shafts 71 and scoring tool shafts 72. The units 60 and 70 have sliding surfaces 64 and 74 which are provided on the front side and the rear side of each of a pair of bearing boxes 63 and 73 of the units, and the sliding surfaces 64 and 74 are slidably in contact with vertical sliding surfaces 53 of the frame 50. Hydraulic piston cylinders 65 and 75 are used as driving apparatuses for vertically moving the units 60 and 70. The cylinders 65 and 75 are respectively provided with cylinders 651 and 751 secured to the frame 50, pistons (not shown) associated with the cylinders 651 and 751, piston rods 652 and 752, and coupling pins 653 and 753 for rotatably connecting the top end of the piston rods with projections 631 and 731 of the bearing boxes.

The unit 70 is provided with projections 732 which are adapted to support the support rod 44 of the lower front guide-plate 40 and a support rod 94 of the lower rear guide-plate 90 thereon. Also, the frame 50 is provided with receiving pieces 54 to prevent the support rods 44 and 94 from being descended under the level of the receiving pieces.

The front end 81 of the upper rear guide-plate 80 is rotatably supported on the top ends of a pair of coupling rods 84, which are connected with the front end 91 of the lower rear guide plate 90 so that the front end 81 may be aligned with the exit of the unit 60, while the rear end 83 of the upper rear guide-plate 80 is rotatably supported on the frame 52 through a support shaft 82 so that the rear end 83 may be aligned with the entrance 101 of a following process or cut-off machine 100. The front end 91 of the lower rear guide-plate 90 is supported on the projections 732 of the lower unit 70 through the support rod 94 secured on the under side of the front end 91 so that the front end may be aligned with the exit of the unit 70, while the rear end 93 of the lower rear guide-plate 90 is rotatably supported on the frame 52 through a support shaft 92 so that the rear end 93 may be aligned with the entrance 101 of the following process 100.

Figure 17:
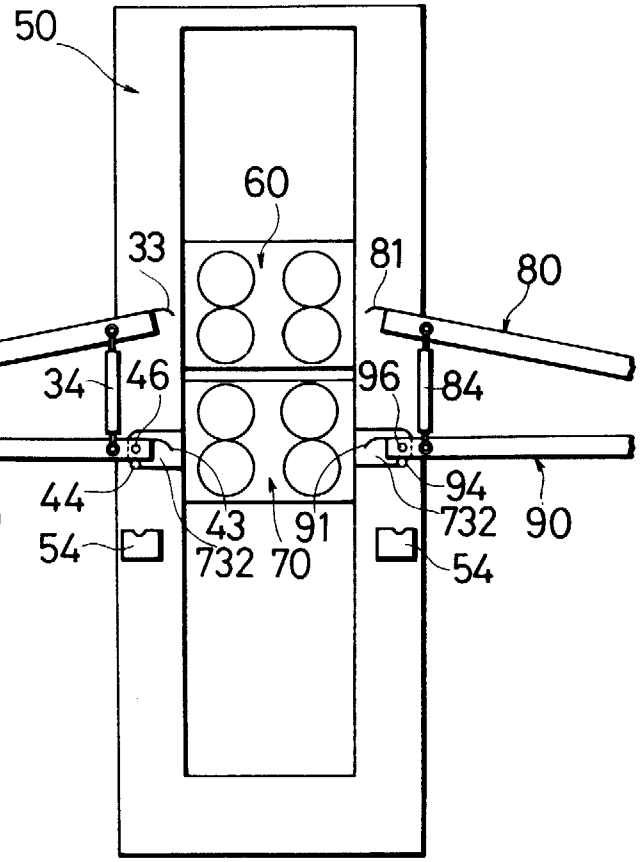

FIG. 17 shows another embodiment wherein the rear end 43 of the lower front guide-plate 40 and the front end 91 of the lower rear guide-plate 90 are respectively supported at the projections 732 of the unit 70. In this example, support shafts 46 and 96 which are fixed at the rear end 43 of the lower front guide-plate 40 and the front end 91 of the lower rear guide-plate 90 are rotatably supported in holes (not shown) made in the projections 732 of the unit 70.

Then, the operation of the apparatus according to the present invention will be described hereinafter. As shown in FIG. 6 to FIG. 13, operating positions 601, 701, stand-by positions 602, 702 and preparing positions 603, 703 are provided in connection with the vertical movement of the units 60 and 70. The operating position is a position where the corrugated board A is extended through the unit 60 or 70, and is slitted and scored. The preparing position is a position where positions of the slitting and scoring tools of the unit 60 or 70 are changed on the shafts. The stand-by position is a position where the unit 60 or 70, the slitting and scoring tools of which have been changed positions, stands by to be moved to the operating position. The stand-by position may coincide with the preparing position, that is, the preparing position may be included in the standby position due to spaces and devices for positioning slitting and scoring tools.

Figure 7:
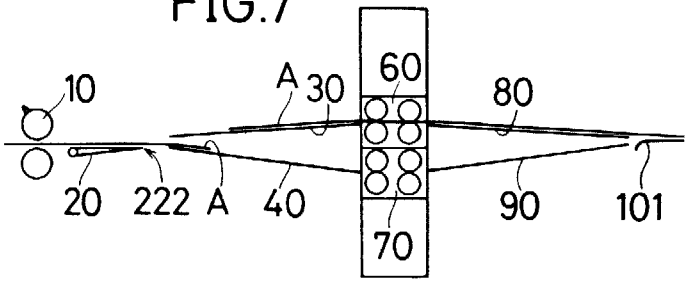
FIG. 6 to FIG. 13 are illustrating diagrams each showing the operation of the apparatus of the present invention.
Figure 6:
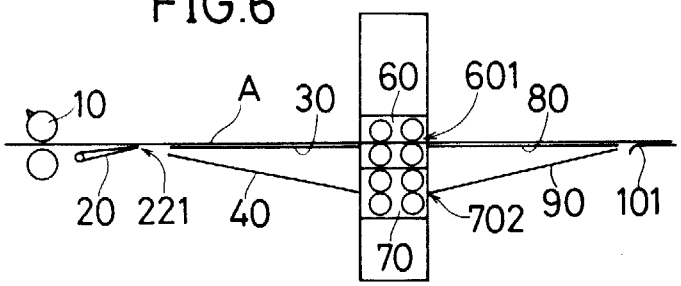
Figure 13:
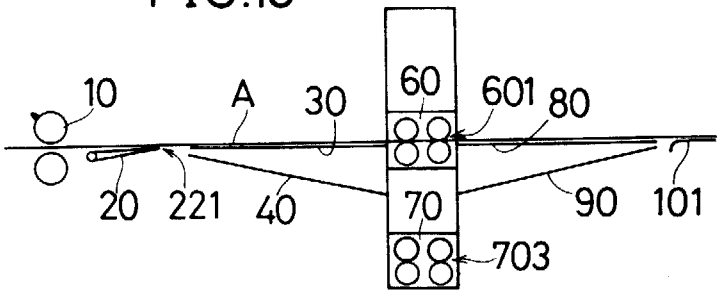
Figure 12:
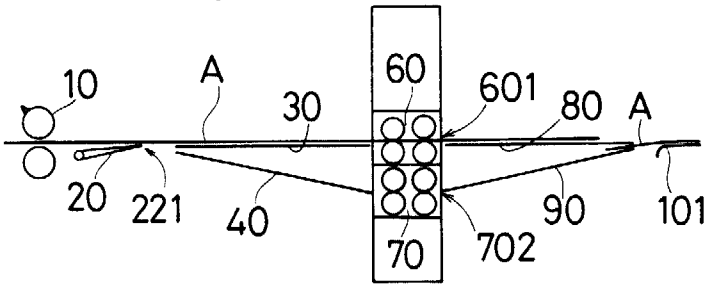

When the unit 60 is located in the operating position 601 as shown in FIG. 13, positions of the slitting and scoring tools of the unit 70 are changed in the preparing position 703. After an operation for positioning tools has been completed, the unit 70 is moved to the standby position 702 as shown in FIG. 6. At the time of the order change, the unit 70 is driven firstly by a driving machine 730 in the stand-by position 702. When the order-change starts, the rotary shear 10 operates to instantly cut off transversely the corrugated board A fed continuously. As shown in FIG. 7, the deflector 20 is pivoted and the rear end 22 is diverted from the upward position 221 to the downward position 222, thereby the upstream portion of the corrugated board, which is delivered after the corrugated board have been cut off, is moved into the lower front guide-plate 40.

Figure 2:
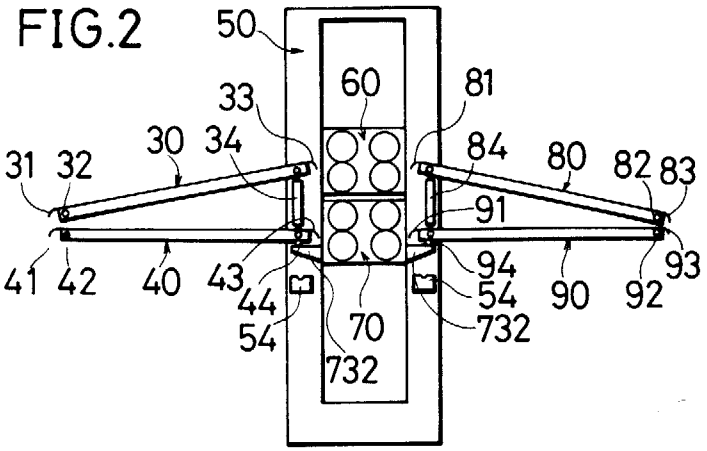
Figure 5:
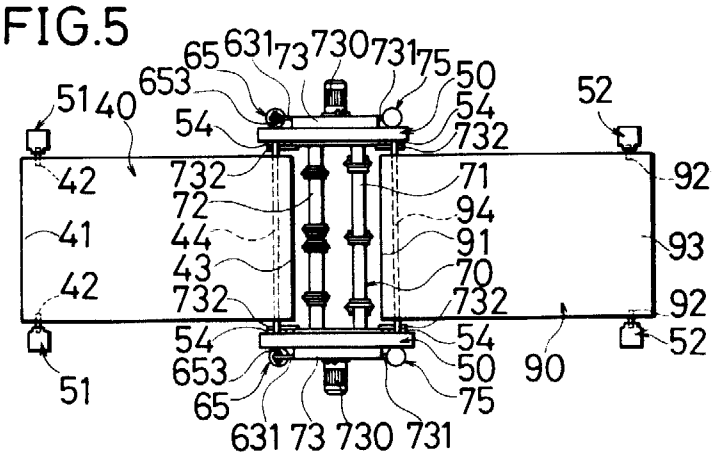
FIG. 5 is a plan view showing major portions of the embodiment shown in FIG. 1, wherein the upper front guide plate and the upper rear guide plate are omitted for the sake of clearness.
Figure 4:
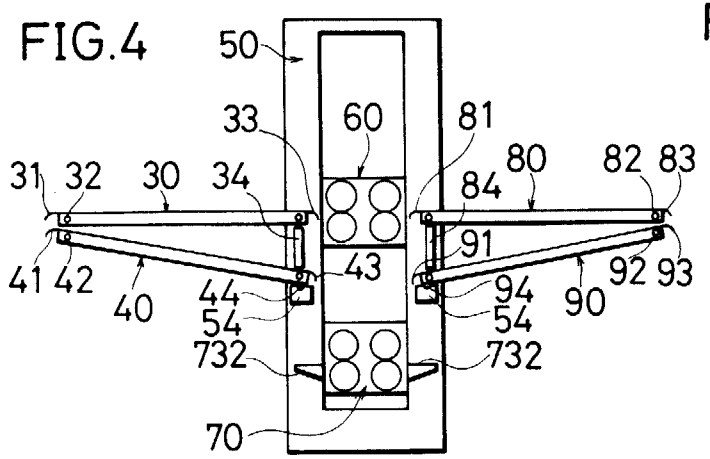
Figure 9:
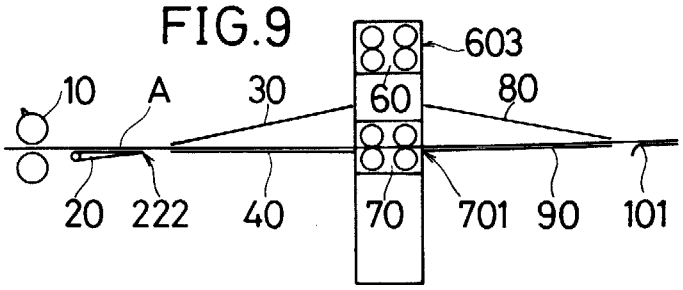
Figure 8:
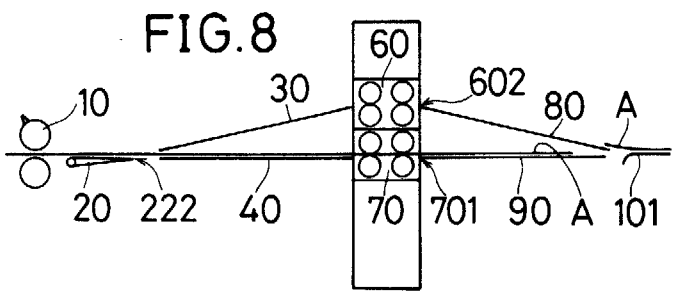
Figure 11:
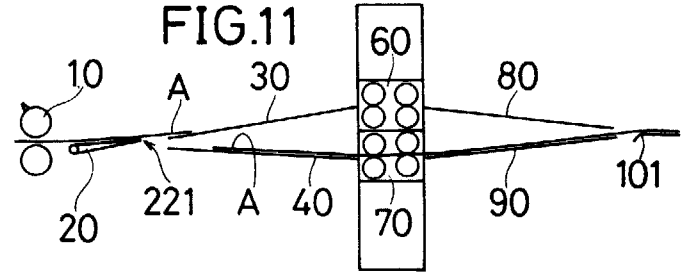

At the same time, the apparatuses 65 and 75 operate to raise the operating unit 60 and the driven unit 70 respectively, thereby the unit 60 is moved from the operating position 601 to the stand-by position 602 and the unit 70 is moved from the stand-by position 702 to the operating position 701 as shown in FIG. 8. When the unit 70 is raised, the support rods 44 and 94 placed on the receiving pieces 54 are raised by the projections 732 as shown in FIG. 2. Thus, the rear end of the upper front guide-plate 30 is raised through the coupling rods 34, while the front end of the upper rear guide-plate 80 is raised through the coupling rods 84. During the vertical movement of the units, the rear end 33 of the upper front guide-plate 30 and the front end 81 of the upper rear guide-plate 80 are kept aligned respectively with the entrance of the unit 60 and the exit thereof, while the rear end 43 of the lower front guide-plate 40 and the front end 91 of the lower rear guide-plate 90 are kept aligned respectively with the entrance of the unit 70 and the exit thereof. The downstream portion of the corrugated board A cut off by the rotary shear 10 passes through the unit 60 from the upper front guide-plate 30 and proceeds from the upper rear guide-plate 80 to the entrance 101 of the following process 100. The upstream portion of the corrugated board A passes through the unit 70 from the lower front guide-plate 40 and proceeds from the lower rear guide-plate 90 to the entrance 101 of the following process 100. After the unit 60 is moved to the stand-by position 602, the unit 60 is further moved to the preparing position 603, as shown in FIG. 9, to make preparations for a following order change.

According to the operation of order-changing in a case where the preparing position is included in the stand-by position and the preparing position coincides with the stand-by position, the slitting and scoring tools of the unit 70 are positioned again in the stand-by position 702 when the unit 60 is located in the operating position 601 as shown in FIG. 6. After the slitting and scoring tools have been positioned, the unit 70 is driven by the driving machine 730. When the order-change starts, the rotary shear 10 operates to instantly cut off transversely the corrugated board A fed continuously, as shown in FIG. 7, and the upstream portion of the corrugated board A, which is delivered after the cutting operation, is moved to the lower front guide-plate 40. At the same time, the apparatuses 65 and 75 operate respectively to raise the operating unit 60 and the racing unit 70, thereby the unit 60 is moved from the operating position 601 to the stand-by position 602 and the unit 70 is moved from the stand-by position 702 to the operating position 701 as shown in FIG. 8. The downstream portion of the corrugated board A passes through the unit 60 from the upper front guide plate 30, thereby the portion is moved from the upper rear guide plate 80 to the entrance 101 of the following process 100. The upstream portion of the corrugated board A, which has been moved to the lower front guide-plate 40, passes through the unit 70 from the lower front guide-plate 40 and proceeds from the rear guide-plate 90 to the entrance 101 of the following process 100. When the unit 60 is moved to the stand-by position 602, the slitting and scoring tools are positioned again to make preparations for a following order change.

Figure 10:
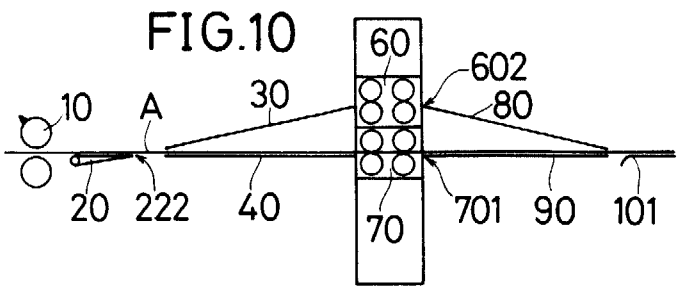

The order change from the unit 60 to the unit 70 has been described hereinabove. The order change from the unit 70 to the unit 60 is shown in FIG. 10, to FIG. 13, and is the same as the above-described. Accordingly, further description will be omitted.

Figure 14:
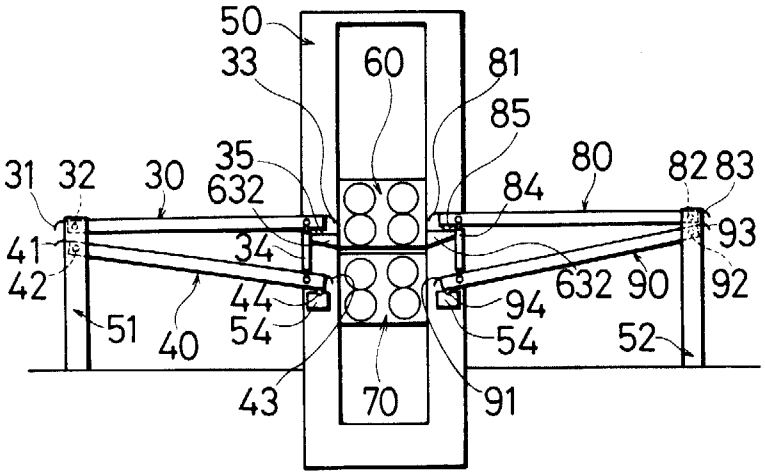

FIG. 14 shows another embodiment of the present invention. In this embodiment, the rear end 33 of the upper front guide-plate 30 is rotatably supported on projections 632 of the unit 60 through a support rod 35 secured to the under side of the rear end so that the rear end may be aligned with the entrance of the unit 60, and the rear end 43 of the lower front guide-plate is connected with the bottom ends of a pair of coupling rods 34 suspended from the rear end 33 of the front guide-plate 30 so that the rear end may be aligned with the entrance of the unit 70. The front end 81 of an upper rear guide-plate 80 is rotatably supported on the projections 632 of the unit 60 through a support rod 85 secured to the under side of the front end so that the front end may be aligned with the exit of the unit 60, and the front end 91 of a lower rear guide-plate 90 is rotatably connected with the bottom ends of a pair of coupling rods 84 suspended from the front end 81 of the upper rear guide-plate 80 so that front end may be aligned with the exit of the unit 70. Since the embodiment of FIG. 14 is completely the same as the previous embodiment with the exception of the above description, further description will be omitted.

Figure 15:
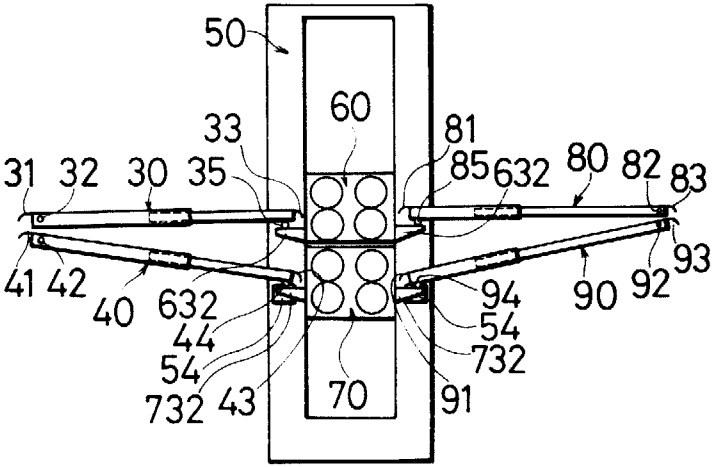
FIG. 14, FIG. 15, FIG. 16 and FIG. 17 are illustrating diagrams each showing the major portions of another embodiment of the present invention.

FIG. 15 shows further another embodiment of the present invention. In this embodiment, the rear end 33 of an upper front guide-plate 30, which can be extended or contracted longitudinally, is rotatably supported on projections 632 of the unit 60 through a support rod secured to the under side of the rear end so that the rear end may be alinged with the entrance of the unit 60, and the rear end 43 of the lower front guide-plate, which can be extended or contracted longitudinally, is rotatably supported on projections 732 of the unit 70 through a support rod 44 secured to the under face of the rear end so that the rear end may be aligned with the entrance of the unit 70. The front end 81 of an upper rear guide-plate 80, which can be extended or contracted longitudinally, is rotatably supported 81 on the projections 632 of the unit 60 through a support rod 85 secured to the under face of the front end so that the front end may be aligned with the exit of the unit 60, and the front end 91 of a lower rear guide-plate 90, which can be extended or contracted longitudinally, is rotatably supported on the projections 732 of the unit 70 through a support rod 94 secured to the under face of the front end so that the front end may be aligned with the exit of the unit 70. Since the embodiment of FIG. 15 is the same as the previous embodiment with the exception of the above description, further description will be omitted.

Figure 16:
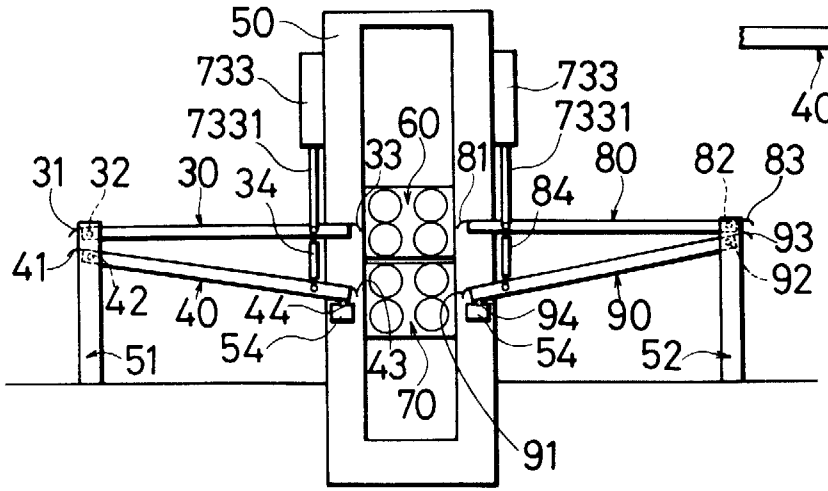

FIG. 16 shows still further another embodiment of the present invention. In this embodiment, the rear end 33 of the upper front guide-plate is supported on the top ends of a pair of coupling rods, one of which is driven by an apparatus for ascending and descending (piston cylinder apparatus) 733 mounted on the machine frame 50 so that the rear end 33 may be alinged with the entrance of the unit 60, and the rear end 43 of the lower front guide-plate 40 is rotatably connected with the bottom ends of a pair of coupling rods 34 rotatably suspended from the rear end 33 of the upper front guide-plate 30 so that the rear end 43 may be aligned with the entrance of the unit 70. The front end 81 of an upper rear guide-plate 80 is supported on the top ends of a coupling rods, one of which is driven by another apparatus for ascending and descending (piston cylinder apparatus) 733 mounted on the machine frame 50 so that the front end 81 may be alinged with the entrance of the unit 60, and the front end 91 of a lower rear guide-plate 90 is rotatably connected with the bottom ends of a pair of coupling rods 84 rotatably suspended from the front end 81 of the rear guide-plate 80 so that the front end may be aligned with the exit of the unit 70. The apparatuses for ascending and descending 733 operatively cooperate with the apparatuses 65 and 75 through known electric, hydraulic pressure or mechanical apparatuses, so that the rear ends 33 and 43 of the front guide-plates 30 and 40 may be aligned respectively with the entrances of the unis 60 and 70 which are ascended or descended, and so that the front ends 81 and 91 of the rear guide-plates 80 and 90 may be aligned respectively with the exits of the units 60 and 70. Since the embodiment of FIG. 16 is the same as the previous embodiment, with the exception of the above description, further description will be omitted.

As described hereinabove, according to the apparatus of the present invention, the upper and lower front guide-plates and the upper and lower rear guide-plates are adapted to be always aligned respectively with the entrance and exit of each of the upper and lower units, when the units are ascending or descending between the operating position and the stand-by operation. The preparing position may coincide with the stand-by position. Furthermore, since the operating positions of the upper and lower units can be disposed closely so that the operating positions of the units may be overlapped. Thus, the order change for slitting and scoring operations can be immediately performed. In addition, the materials can be slitted and scored, while the materials pass along an approximately straight line from the exit of the cutting machine through either the upper or lower unit to the entrance of the following process. Accordingly, in the apparatus of the present invention, the total length of the slitter-scorer apparatus can be shortened to the upmost. The highly efficient slitter-scorer apparatus according to the present invention can be installed on a place where old apparatuses for producing corrugated boards have been settled, and there are no more spaces.

What is claimed is:

1. A slitter-scorer apparatus which can immediately change longitudinal slitting and scoring operations along the flowing direction of continuously fed long and flat materials thereby to perform the slitting and scoring operations without reducing the flowing speed thereof and deliver the materials to a following process, characterized in that said slitter-scorer apparatus comprises a cutting machine for instantly cutting off the materials transversely; a movable deflector disposed at the exit of said cutting machine to guide said materials to an upward position or a downward position; a machine frame disposed behind said deflector; an upper slitter-scorer unit and a lower slitter-scorer unit disposed in one above the other relationship on said machine frame, said slitter-scorer units being so mounted on said frame as to be capable of ascending and descending respectively between an operating position and a stand-by position on said machine frame, the operating position of said upper slitter-scorer unit occupying approximately the same location as the operating position of said lower slitter-scorer unit; an upper front guide plate adapted to guide said materials from the upward position of said deflector to the entrance of said upper slitter-scorer unit; an upper rear guide plate adapted to guide said materials from the exit of said upper slitter-scorer unit to the entrance of the following process; a lower front guide plate adapted to guide said materials from the downward position of said deflector to the entrance of said lower slitter-scorer unit; a lower rear guide plate adapted to guide said materials from the exit of said lower slitter-scorer unit to the entrance of the following process; said upper guide plates being mounted for movement to align with said upper slitter-scorer unit when it is in its operative position and said lower guide plates being mounted for movement to align with said lower slitter-scorer unit when it is in its operative position; whereby said upper and lower slitter-scorer units may be caused to ascend or descend during the performance of order changes; and said longitudinal slitting and scoring operations may be performed on the materials which are delivered along an approximately straight line from said cutting machine to the following process through one or the other of said upper and lower slitter-scorer units.

2. A slitter-scorer apparatus as defined in claim 1 wherein either of said upper or lower slitter-scorer units is movable to a preparing position on said frame that is more remote from the operating position than said stand-by position.

3. A slitter-scorer apparatus as defined in claim 1, wherein the front end of said lower front guide plate is rotatably supported on a frame so that the front end thereof may be aligned with the downward position of said deflector, while the rear end of said lower front guide plate is supported on projections of said lower slitter-scorer unit so that the rear end thereof may be aligned with the entrance of said lower slitter-scorer unit; and the front end of said upper front guide plate is rotatably supported on said frame so that the front end thereof may be aligned with the upward position of said deflector, while the rear end of said upper front guide plate is supported at the ends of a pair of coupling rods provided on the rear end of said lower front guide plate whereby to be aligned with the entrance of said upper slitter-scorer unit.

4. A slitter-scorer apparatus as defined in claim 1, wherein the front end of said lower rear guide-plate is supported on projections of said lower slitter-scorer unit so that the front end thereof may be aligned with the exit of said lower slitter-scorer unit, while the rear end of said lower rear guide-plate is rotatably supported on a frame so that the rear end thereof may be aligned with the entrance of the following process; and the front end of said upper rear guide-plate may be supported on a pair of coupling rods provided on the front end of said lower rear guide-plate so that the front end thereof may be aligned with the exit of said upper slitter-scorer unit, while the rear end of said upper rear guide-plate is rotatably supported on said frame so that the rear end thereof may be aligned with the entrance of said following process.

5. A slitter-scorer apparatus as defined in claim 1, wherein the front end of said upper front guide-plate is rotatably supported on a frame so that the front end thereof may be aligned with said upward position of said deflector, while the rear end of said upper front guide-plate is freely mounted on projections of said upper slitter-scorer unit so that the rear end thereof may be aligned with the entrance of said upper slitter-scorer unit; and the front end of said lower front guide-plate is rotatably supported on said frame so that the front end thereof may be alinged with said downward position of said deflector, while the rear end of said lower front guide-plate is connected with the ends of a pair of coupling rods suspended from the rear end of said upper front guide-plate, so that the rear end thereof may be aligned with the entrance of said lower slitter-scorer unit.

6. A slitter-scorer apparatus as defined in claim 1, wherein the front end of said upper rear guide-plate is freely mounted on projections of said upper slitter-scorer unit so that the front end thereof may be aligned with the exit of said upper slitter-scorer unit, while the rear end of said upper rear guide-plate is rotatably supported on a frame so that the rear end thereof may be aligned with the entrance of said following process; and the front end of said lower rear guide-plate is connected with the ends of a pair of coupling rods suspended from the front end of said upper rear guide-plate so that the front end thereof may be aligned with the exit of said lower slitter-scorer unit, while the rear end of said lower rear guide-plate is rotatably supported on said frame so that the rear end thereof may be aligned with the entrance of said following process.

7. A slitter-scorer apparatus as defined in claim 1, wherein the front end of said upper front guide-plate is rotatably supported on a frame so that the front end thereof may be aligned with said upward position of said deflector, while the rear end of said upper front guide-plate is rotatably supported on projections of said upper slitter-scorer unit so that the rear end thereof may be aligned with the entrance of said upper slitter-scorer unit; and the front end of said lower front guide-plate is rotatably supported on said frame so that the front end thereof may be aligned with said downward position of said deflector, while the rear end of said lower front guide-plate is rotatably supported on projections of said lower slitter-scorer unit so that the rear end thereof may be aligned with the entrance of said lower slitter-scorer unit.

8. A slitter-scorer apparatus as defined in claim 1, wherein the front end of said upper rear guide-plate is rotatably supported on projections of said upper slitter-scorer unit so that the front end thereof may be aligned with the exit of said upper slitter-scorer unit, while the rear end of said upper rear guide-plate is rotatably supported on a frame so that the rear end thereof may be aligned with the entrance of said following process; and the front end of said lower rear guide-plate is rotatably supported on projections of said lower slitter-scorer unit so that the front end thereof may be aligned with the exit of said lower slitter-scorer unit, while the rear end of said lower rear guide-plate is rotatably supported on said frame so that the rear end thereof may be aligned with the entrance of said following process.

9. A slitter-scorer apparatus as defined in claim 1, wherein the front end of said upper front guide-plate is rotatably supported on a frame so that the front end thereof may be aligned with said upward position of said deflector, while the rear end of said upper front guide-plate is connected with the top ends of a pair of coupling rods which are driven by an apparatus for ascending and descending said upper end lower front guide-plates so that the rear end thereof may be aligned with the entrance of said upper slitter-scorer unit; and the front end of said lower front guide-plate is rotatably supported on said frame so that the front end thereof may be aligned with said downward position of said deflector, while the rear end of said lower front guide-plate is connected with the bottom ends of said coupling rods so that the rear end thereof may be aligned with the entrance of said lower slitter-scorer unit.

10. A slitter-scorer apparatus as defined in claim 1, wherein the front end of said upper rear guide-plate is connected with the top ends of a pair of coupling rods which are driven by an apparatus for ascending and descending said upper and lower rear guide-plates so that the front end thereof may be aligned with the exit of said upper slitter-scorer unit, while the rear end of said upper rear guide-plate is rotatably support on a frame so that the rear end thereof may be aligned with the entrance of said following process; and the front end of said lower rear guide-plate is connected with the bottom ends of said coupling rods so that the front end thereof may be aligned with the exit of said lower slitter-scorer unit, while the rear end of said lower rear guide-plate is rotatably supported on said frame so that the rear end thereof may be aligned with the entrance of said following process.

11. A slitter-scorer apparatus which can immediately change slitting and scoring operations on a long and flat material web continuously fed in an essentially horizontal path thereby to perform different slitting and scoring operations without reducing the speed of said web and deliver said web to a following process, said slitter-scorer apparatus having a cutter disposed in said path for instantly cutting the web transversely, upper and lower slitter-scorer units disposed downstream of said cutter, said upper slitter-scorer unit being movable between an operating position in alignment with said horizontal path and a position *above said path and said lower slitter-scorer unit being movable between an operating position in alignment with said horizontal path and a position* below said path, movable guide means interposed between said cutter and said slitter-scorer units and operable for selectively guiding said web toward said upper slitter-scorer unit when said upper slitter-scorer unit is in either position and toward said lower slitter-scorer unit when said lower slitter-scorer unit is in either position, one of said slitter-scorer units thereby normally being disposed in said horizontal path during a slitting and scoring operation phase and the other slitter-scorer unit being disposed above or below said path, and means effective immediately when said web is cut transversely at the end of that phase to essentially simultaneously deflect said web to said other slitter-scorer unit and to move said slitter-scorers to locate other slitter scorer unit in alignment with said horizontal path.

12. The slitter-scorer apparatus defined in claim 11 wherein said slitter-scorer units are mounted one above the other and are mounted for vertical sliding movement between said positions.

13. In the slitter-scorer apparatus defined in claim 11, said guide means comprising two angularly related guide members pivoted at their ends nearer the cutter and there being means correlated with actuation of said means for deflecting the web whereby one or the other of said guide members is moved into alignment with the slitter-scorer unit disposed in alignment with said horizontal path for a normal slitter-scorer action.

14. In the slitter-scorer apparatus defined in claim 11, means whereby said movement of said guide members is positively effected by movement of said slitter-scorer units between said positions.

* * * * *